US009308957B2

(12) United States Patent
Matsuda

(10) Patent No.: US 9,308,957 B2
(45) Date of Patent: Apr. 12, 2016

(54) SADDLE-TYPE ELECTRIC VEHICLE

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 13/976,453

(22) PCT Filed: Dec. 27, 2010

(86) PCT No.: PCT/JP2010/007580
§ 371 (c)(1),
(2), (4) Date: Jun. 26, 2013

(87) PCT Pub. No.: WO2012/090245
PCT Pub. Date: Jul. 5, 2012

(65) Prior Publication Data
US 2013/0277133 A1    Oct. 24, 2013

(51) Int. Cl.
*B62K 11/00* (2006.01)
*B62K 11/04* (2006.01)
*B62M 7/02* (2006.01)
*F16N 7/38* (2006.01)
*B62K 19/30* (2006.01)

(52) U.S. Cl.
CPC ............. *B62K 11/00* (2013.01); *B62K 11/04* (2013.01); *B62K 19/30* (2013.01); *B62M 7/02* (2013.01); *F16N 7/38* (2013.01); *B62K 2204/00* (2013.01)

(58) Field of Classification Search
CPC .......... B60K 1/00; B60K 1/04; B60K 7/0007; B60K 2001/003; B62K 2204/00
USPC .................................... 180/65.1, 220
See application file for complete search history.

(56) References Cited

U.S. PATENT DOCUMENTS

| 5,111,090 A | 5/1992 | Otake et al. |
| 5,501,292 A * | 3/1996 | Kawashima et al. ......... 180/220 |
| 5,657,830 A | 8/1997 | Kawashima et al. |
| 6,903,471 B2 * | 6/2005 | Arimitsu et al. ............... 310/59 |

FOREIGN PATENT DOCUMENTS

| CN | 101492087 A | 7/2009 |
| CN | 201357926 Y | 12/2009 |

(Continued)

OTHER PUBLICATIONS

Japanese Patent Office, International Search Report of PCT/JP2010/007580, Apr. 12, 2011, WIPO, 2 pages.

(Continued)

*Primary Examiner* — Joseph Rocca
*Assistant Examiner* — Felicia L Brittman
(74) *Attorney, Agent, or Firm* — Alleman Hall McCoy Russell & Tuttle LLP

(57) ABSTRACT

In a saddle-type electric vehicle such as an electric motorcycle, a motor shaft of a driving electric motor extends in a rightward and leftward direction and one end portion in the rightward and leftward direction is coupled to a transmission, a transmission accommodating section of a motor unit case is fastened at right and left sides to a vehicle body frame, and a motor accommodating section is coupled to the transmission accommodating section at one end portion in the rightward and leftward direction. Thus, misalignment of bearings of the motor shaft due to deflection of the motor unit case can be suppressed while reducing a weight of the motor unit case.

6 Claims, 5 Drawing Sheets

(56) References Cited

FOREIGN PATENT DOCUMENTS

| | | |
|---|---|---|
| CN | 201400282 Y | 2/2010 |
| EP | 1414134 A2 | 4/2004 |
| JP | 04151386 A | 5/1992 |
| JP | 05065085 A | 3/1993 |
| JP | 2001155749 A | 6/2001 |
| JP | 2007182833 A | 7/2007 |
| JP | 2009132252 A | 6/2009 |
| JP | 2009227130 A | 10/2009 |
| JP | 2009248828 A | 10/2009 |
| JP | 201018270 A | 1/2010 |

OTHER PUBLICATIONS

European Patent Office, Extended European Search Report of EP10861285, Apr. 17, 2014, Germany, 7 pages.

ISA Japanese Patent Office, International Search Report Issued in Application No. PCT/JP2010/007580, Apr. 12, 2011, 2 pages.

European Patent Office, Extended European Search Report Issued in Application No. 11852569.0, Jun. 22, 2015, Germany, 6 pages.

\* cited by examiner

SADDLE-TYPE ELECTRIC VEHICLE

TECHNICAL FIELD

The present invention relates to a saddle-type electric vehicle including an electric motorcycle incorporating an electric motor as a driving source, an ATV (all terrain vehicle) incorporating the electric motor as the driving source, and a hybrid electric vehicle incorporating an engine in addition the electric motor. Particularly, the present invention relates to a structure of a motor unit case for accommodating an electric motor, a transmission mechanism of driving power generated in the electric motor, etc.

BACKGROUND ART

With increasing awareness about the environment and in view of depleted oil sources in the future, there has been a need for reduction of fuel consumption in automobiles, motorcycles, etc. Also, secondary batteries such as a lithium ion battery have been making remarkable progresses. Attempts to use electric power as driving power in electric automobiles, hybrid automobiles, etc., have been vigorously made.

For example, Patent Literature 1 discloses a sport type electric motorcycle incorporating an electric motor of a large size and a high output. In this electric motorcycle, a driving unit including an electric motor and a driving power transmission device is placed in a location where an engine and a transmission are conventionally placed, and a speed of rotation of a motor shaft is reduced by gears to increase torque, and then the rotation is transmitted to a rear wheel via a chain.

CITATION LIST

Patent Literature

Patent Literature 1: Japanese Laid-Open Patent Application Publication No. 2010-018270

SUMMARY OF INVENTION

Technical Problem

As should be known, the electric motor does not generate a vibration attributed to explosion of an air-fuel mixture or an inertia force of reciprocatable elements unlike an internal combustion engine. Therefore, a case of a motor unit is required to be thinner to reduce a weight of a vehicle.

However, in the saddle-type electric vehicle of the above stated conventional example, the motor unit is directly mounted to a vehicle body frame in many cases. Therefore, the case of the motor unit tends to be deflected due to warping or twisting of the frame, which should be taken into account. If the case of the motor unit is thinned, it is more likely to be deflected to a greater degree, so that misalignment of bearings supporting an output shaft of the motor occurs. This causes a problem, for example, an increase in a rotational resistance.

Under the circumstances, an object of the present invention is to provide a structure in a saddle-type electric vehicle, which can suppress misalignment of motor bearings which would be caused by deflection of a motor unit case while reducing a weight of the motor unit case as much as possible.

Solution to Problem

To achieve the above objective, the present invention is directed to a saddle-type electric vehicle comprising an electric motor for driving the electric vehicle; and a power transmission mechanism for transmitting driving power generated by the electric motor. When an output shaft (motor shaft) of the electric motor extends in a rightward and leftward direction of the vehicle, and one end portion of the output shaft in the rightward and leftward direction is coupled to the power transmission mechanism, in a motor unit case including a motor accommodating section for accommodating the electric motor and a transmission mechanism accommodating section for accommodating the power transmission mechanism such that the motor accommodating section and the transmission mechanism accommodating section have a unitary construction, the transmission mechanism accommodating section is fastened at right and left sides to a vehicle body frame, and the motor accommodating section is joined at one end portion in the rightward and leftward direction to the transmission mechanism accommodating section.

In the above structure, if the vehicle body frame is warped or twisted during driving of the electric motorcycle, the transmission mechanism accommodating section of the motor unit case which is fastened at right and left sides to the vehicle body frame, is affected relatively more. On the other hand, the motor accommodating section joined to the transmission mechanism accommodating section at one end portion in the rightward and leftward direction is not affected substantially. Therefore, the motor accommodating section is not deflected so much, and hence misalignment of motor bearings due to the deflection is suppressed.

A positional relationship between the transmission mechanism accommodating section and the motor accommodating section changes due to the deflection of the entire motor unit case. However, the one end portion where the motor accommodating section is joined to the transmission mechanism accommodating section is displaced less than the other side portion. That is, the one end portion at which the end portion of the motor shaft is coupled to the power transmission mechanism is not displaced so much, and this displacement is absorbed by the backlash of gears.

Preferably, the electric motor accommodated in the motor accommodating section may have a cylindrical motor case; and the motor case may be provided with motor bearings on wall portions at both ends of the motor case, respectively, a rotor is supported between the motor bearings such that the rotor is rotatable integrally with the motor shaft, and a stator of the electric motor which encloses an outer periphery of the rotor is internally fitted to a peripheral wall of the motor case.

That is, the motor case which is separate from the motor unit case which may be affected by warping or twisting of the frames is provided and the motor bearings are mounted on the motor case. Thereby, misalignment of the motor bearings can be reduced. Since the stator is fitted into the motor case, stiffness of the peripheral wall of the motor case increases, which can suppress misalignment of the motor bearings.

In that case, preferably, the peripheral wall of the motor case may have a greater thickness than a peripheral wall of the motor accommodating section which is adjacent to the peripheral wall of the motor case. Since the motor case provided with the motor bearings has a higher stiffness than the motor unit case which may be affected by warping or twisting of the vehicle body frame of the electric motorcycle, which can effectively suppress misalignment of the motor bearings.

In the structure in which the motor case which is the separate component is accommodated into the motor accommodating section, a cooling oil passage may be formed to extend circumferentially between the peripheral wall of the motor case and an outer periphery of the stator of the electric motor which is fitted to the peripheral wall of the motor case. An oil introduction port may open in an upper portion of the peripheral wall of the motor case such that the oil introduction port is connected to the oil passage, and the cooling oil is fed to the oil introduction port. An oil discharge port may open in a lower portion of the peripheral wall of the motor case such that the oil discharge port faces an oil pan in a lower portion of the motor unit case. Thus, by using the oil used to lubricate the gears, etc., in the motor unit, the stator of the electric motor can be cooled efficiently.

In this case, the motor unit case may be provided with an oil pump for suctioning up the oil from the oil pan and discharging the oil, and with an oil passage used to feed the oil discharged from the oil pump to the bearings of the motor shaft, the power transmission mechanism, etc. Thus, the oil can be fed to desired members with a simple structure.

The saddle-type electric vehicle may comprise a circulation passage used to circulate the oil between the motor unit case and a heat exchanger outside of the motor unit case. This makes it possible to efficiently cool the oil by the heat exchanger provided outside. In this case, the oil passage used to feed the oil to the power transmission mechanism is preferably provided to divide a flow of the oil discharged from the oil pump in a location before the circulation passage. Since the oil to be fed to the power transmission mechanism which does not require cooling so much is not sent to the heat exchanger, a loss caused by actuation of the oil pump can be lessened.

In the case where the end portion of the motor shaft is coupled to the power transmission mechanism at one end portion in the rightward and leftward direction in the motor case as described above, a rotational angle sensor may be attached to the other end portion. Preferably, the other end wall portion of the motor accommodating section may be joined to an outer peripheral portion of the other end wall portion of the motor case, and an annular seal member intervenes between the other end wall portions to enclose the rotational angle sensor. Thus, if the cooling oil flows into the clearance between the motor accommodating section and the motor case in the motor unit case, this oil will not negatively affect the rotational angle sensor.

The other end wall portion of the motor accommodating section may be provided with an opening in a predetermined range corresponding to the rotational angle sensor, and a lid member may be removably attached to cover the opening. By merely removing the lid member, maintenance of the rotational angle sensor can be carried out easily.

Advantageous Effects of Invention

In accordance with the present invention, since the power transmission mechanism accommodating section is fastened at right and left sides to the vehicle body frame, and the electric motor accommodating section is joined to the power transmission mechanism accommodating section at one end portion thereof where the motor shaft is coupled to the power transmission mechanism, in the motor unit case of the saddle-type electric vehicle, deflection of the motor accommodating section due to the warping or twisting of the vehicle body frame can be suppressed, misalignment of the motor bearings can be lessened, and problems such as an increase in a rotational resistance can be suppressed.

DESCRIPTION OF EMBODIMENTS

Hereinafter, an electric motorcycle according to an embodiment of the present invention will be described with reference to the drawings. The stated directions recited below are the perspective of a driver straddling the electric motorcycle.

—Schematic Configuration of Electric Motorcycle—

Figure 1:
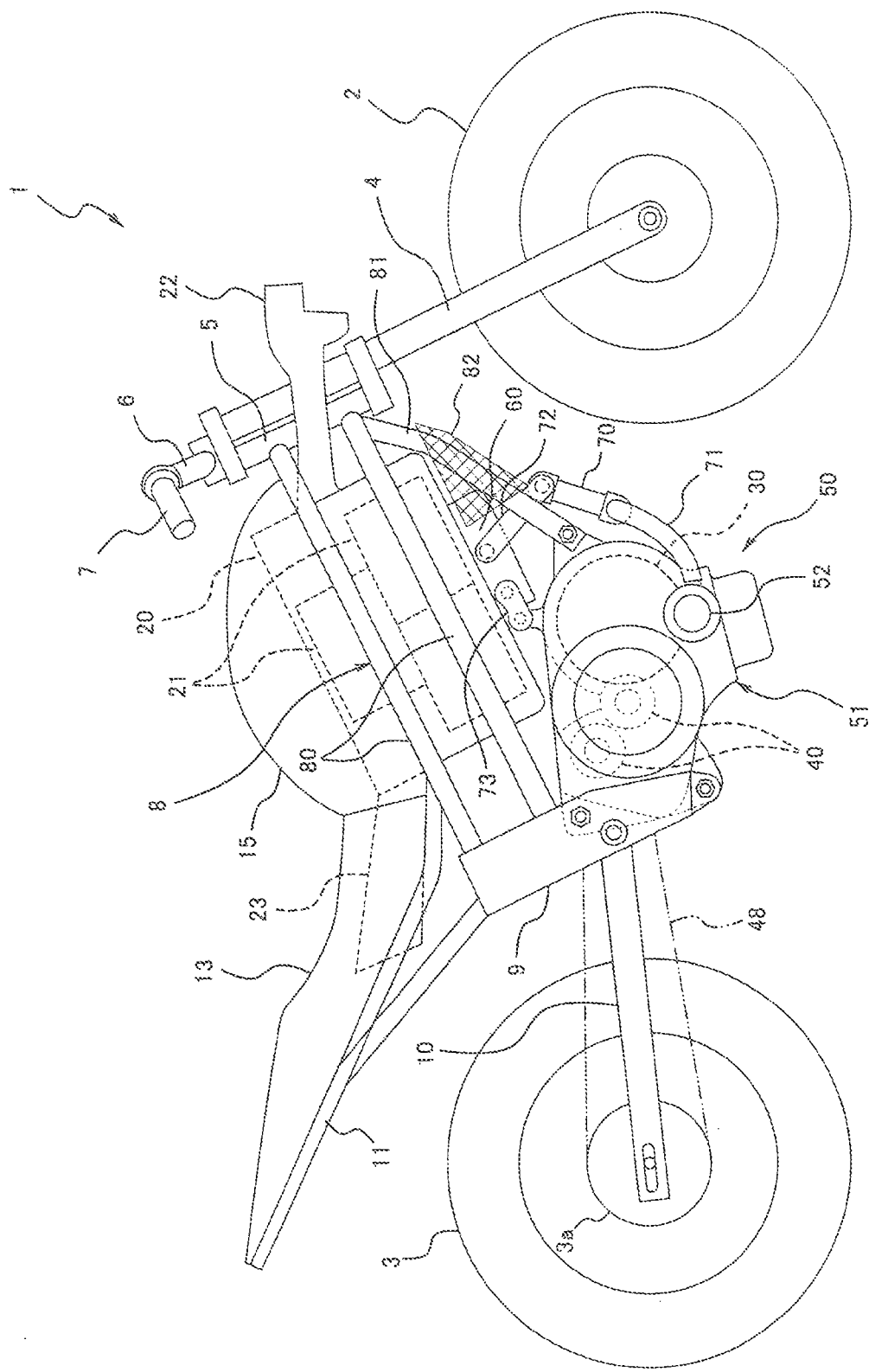
FIG. 1 is a right side view showing major components in an electric motorcycle according to an embodiment of the present invention.

FIG. 1 is a right side view schematically showing major components such as a vehicle body frame, a power plant, and wheels, in an electric motorcycle 1 (electric vehicle) according to an embodiment of the present invention. As shown in FIG. 1, the electric motorcycle 1 includes a front wheel 2 which is a steering wheel and a rear wheel 3 which is a drive wheel. The front wheel 2 is rotatably mounted to lower end portions of a pair of right and left front forks 4 extending substantially vertically. Upper portions of the front forks 4 are mounted to a steering shaft (not shown) via a pair of upper and lower brackets.

The steering shaft is rotatably supported in a state in which the steering shaft is inserted into a head pipe 5 mounted to a vehicle body, and constitutes a steering shaft. A handle 6 extending in a rightward and leftward direction is attached to the upper bracket. When the driver steers the handle 6, the front forks 4 and the front wheel 2 can be steered around the steering shaft. The handle 6 is provided at a right end with an accelerator grip 7 which is gripped by the driver's right hand and rotated by twisting the driver's wrist.

The vehicle body frame of the electric motorcycle 1 includes a main frame 8 extending rearward from the head pipe 5 such that the main frame 8 is inclined slightly downward. For example, the main frame 8 is divided into two parts, i.e., right and left parts, at a front end portion thereof welded to the head pipe 5. The right and left parts are each composed of pipe members 80 arranged at upper and lower sides. The pipe members 80 extend rearward from the head pipe 5, extend rightward and leftward, are curved inward, and then extend rearward such that the pipe members 80 corresponding to the right part are apart from the pipe members 80 corresponding to the left part. Then, the pipe members 80 are curved inward and then rear end portions thereof are coupled to a pivot frame 9.

The pivot frame 9 has a substantially rectangular frame shape. The rear end portions of the pipe members 80 of the main frame 8 are joined and welded to right and left side plates of the pivot frame 9 from inward. Front end portions of a swing arm 10 supporting the rear wheel 3 are mounted between the right and left side plates of the pivot frame 9 such that the swing arm 10 is vertically pivotable. The swing arm 10 extends rearward from its pivot such that it is inclined slightly downward. The rear wheel 3 is rotatably mounted to rear end portions of the swing arm 10.

A rear frame 11 extends from the rear portions of the main frame 8 and upper end portions of the pivot frame 9 such that the rear frame 11 is inclined upward in a rearward direction. A saddle seat 13 is mounted over the rear frame 11. A dummy tank 15 is disposed in front of the seat 13. The driver straddling the electric motorcycle 1 grips the dummy tank 15 between the driver's knees. By gripping the dummy tank 15 with the driver's knees, the driver feels unity with the electric motorcycle 1.

A battery box 20 which is made of resin and accommodates batteries 21 which are the electric storage device, is disposed such that the battery box 20 is covered with the dummy tank 15 from above. For example, the battery box 20 has a rectangular shape and is surrounded by the four pipe members 80 of the main frame 8 from right and from left. Right and left side wall portions of the battery box 20 are fastened to the pipe members 80, respectively, by bolts, or the like.

The plurality of batteries 21 are accommodated into the battery box 20 such that the batteries 21 are separated into right and left modules, and a travelling wind path is formed between the right and left modules. An air guide duct 22 is provided on a front wall of the battery box 20 to guide the travelling wind from forward into the battery box 20 during driving of the electric motorcycle 1, while an air discharge duct 23 is provided on a rear wall of the battery box 20 such that it extends through a space below the seat 13.

For example, a front portion of the air guide duct 22 extends forward farther than the head pipe 5. The travelling wind taken in through the air guide duct 22 is guided to inside of the battery box 20, flows through a space between the right and left modules of the batteries 21, and is discharged through the air discharge duct 23. Positive and negative electrodes and bus bars connecting them are placed on inner side surfaces of the batteries 21 so as to face the travelling wind path. They are directly exposed to the travelling wind and thereby effectively cooled.

When viewed from side as shown in FIG. 1, the battery box 20 is provided in a location close to a center of a vehicle body in a range from the head pipe 5 to the pivot frame 9 in the electric motorcycle 1, and extends along the main frame 8. That is, the battery box 20 having a great weight is mounted in the vicinity of a roll axis, which is preferable to enhance a motion performance of the electric motorcycle 1. A lower surface of the battery box 20 protrudes obliquely forward to be lower than a lower edge of the main frame 8, i.e., the lower pipe member 80, and is inclined to be gradually lower in a direction from its front edge to its rear edge.

In close proximity to and below a rear edge of the lower surface which is the lowest location of the inclined battery box 20, a motor unit 50 including a driving motor 30 constituted by an electric motor and a transmission 40 (power transmission mechanism) is disposed. A rear portion of the motor unit 50 in which the transmission 40 is accommodated is fastened at right and left sides to the pivot frame 9. By comparison, a front portion of the motor unit 50 in which the driving motor 30 is accommodated is suspended by hanger brackets 81 extending downward from a forward side of the main frame 8.

Figure 5:
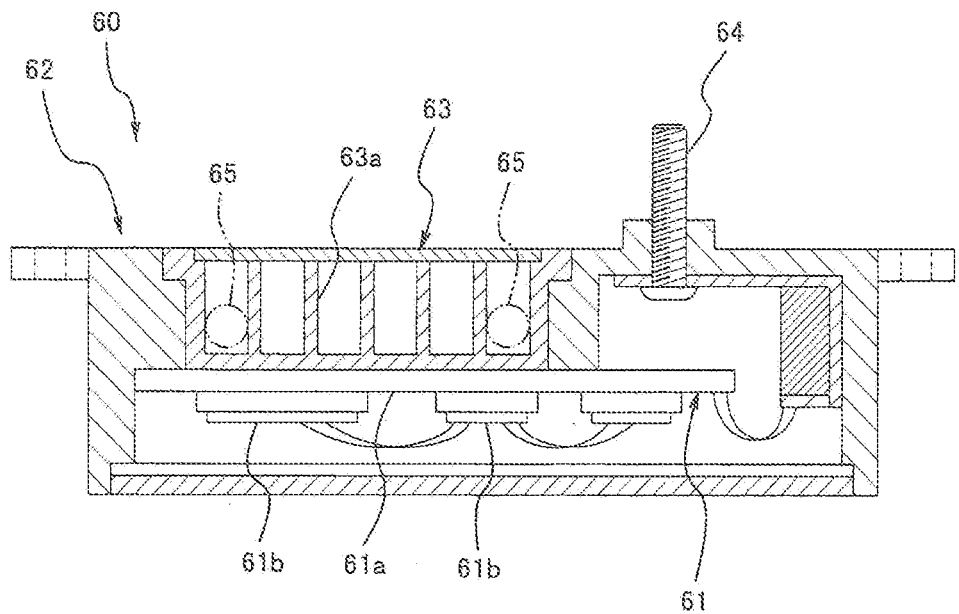
FIG. 5 is a cross-sectional view showing a cooling structure of an electric power control unit.

An electric power control unit 60 is disposed on the lower surface of the battery box 20 in close proximity to and above the motor unit 50. As will be described later with reference to FIG. 5, the electric power control unit 60 is configured in such a manner that a power module 61 incorporating a power semiconductor such as an IGBT (insulated-gate bipolar transistor) is accommodated into a case 62. The electric power control unit 60 causes the driving motor 30 to switch between a motor operation and a power generation operation. Under this control, the power semiconductor generates heat, and the power module 61 raises its temperature. Therefore, the electric power control unit 60 is placed so as to directly receive the travelling wind flowing between the right and left hanger brackets 81.

A protective net 82 is attached over upper portions of the right and left hanger brackets 81 such that the protective net 82 covers a forward side, right and left sides, and an underside of the electric power control unit 60. The protective net 82 is formed of, for example, a metal net, a punching metal, etc., and has meshes which inhibit bouncing stones from passing therethrough, while allowing the travelling wind to pass therethrough.

An oil cooler 70 is mounted to lower portions of the right and left hanger brackets 81. The oil cooler 70 is configured to cool the oil used for cooling the motor unit 50 and the electric power control unit 60 by heat exchange between the travelling wind and the oil. An oil pump 52 is attached to a right lower portion of a case 51 of the motor unit 50. A lower hose 71 extending to be curved forward and obliquely upward from the oil pump 52 is coupled to a lower portion of the oil cooler 70.

The oil fed to the lower portion of the oil cooler 70 through the lower hose 71 is caused to exchange heat with the travelling wind and is thereby cooled while flowing upward through a passage inside of a core of the oil cooler 70. After the oil has been cooled in this way, the oil is fed to the electric power control unit 60 located above the oil cooler 70 via the upper hose 72 coupled to an upper portion of the oil cooler 70. As will be described with reference to FIG. 5 later, the electric power control unit 60 incorporates a cooler 63. The oil which has cooled the power module 61 flows downward through a return hose 73 and is returned to the motor unit 50.

That is, the lower hose 71, the upper hose 72, and the return hose 73 constitute a circular passage R (see FIG. 3) through which the oil is circulated from inside of the motor unit 50, the oil cooler 70 located outside of the motor unit 50, and the electric power control unit 60.

—Configuration of Motor Unit—

Figure 2:
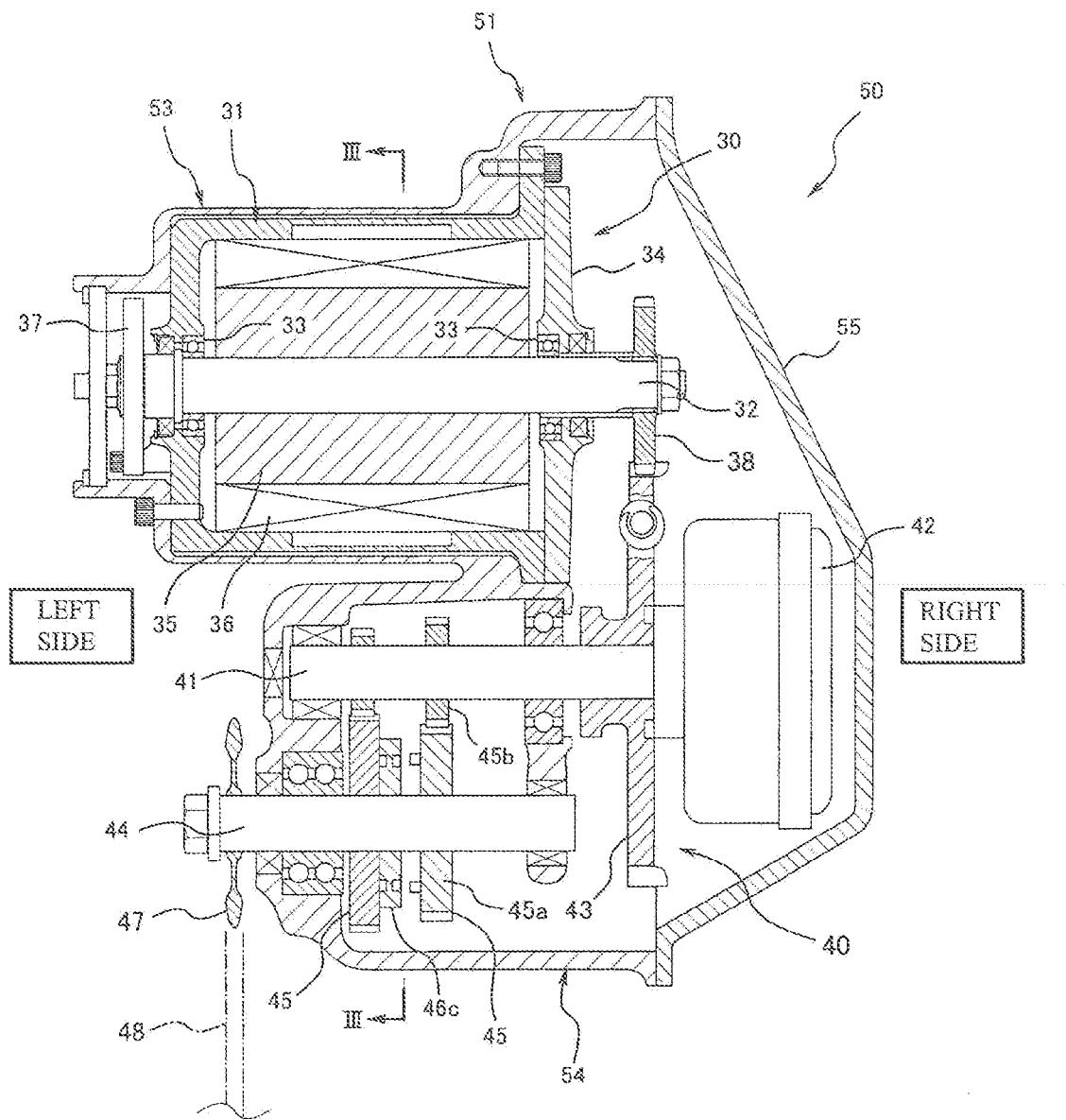
FIG. 2 is an exploded view showing a schematic structure of a driving motor and a transmission of a motor unit.
Figure 3:
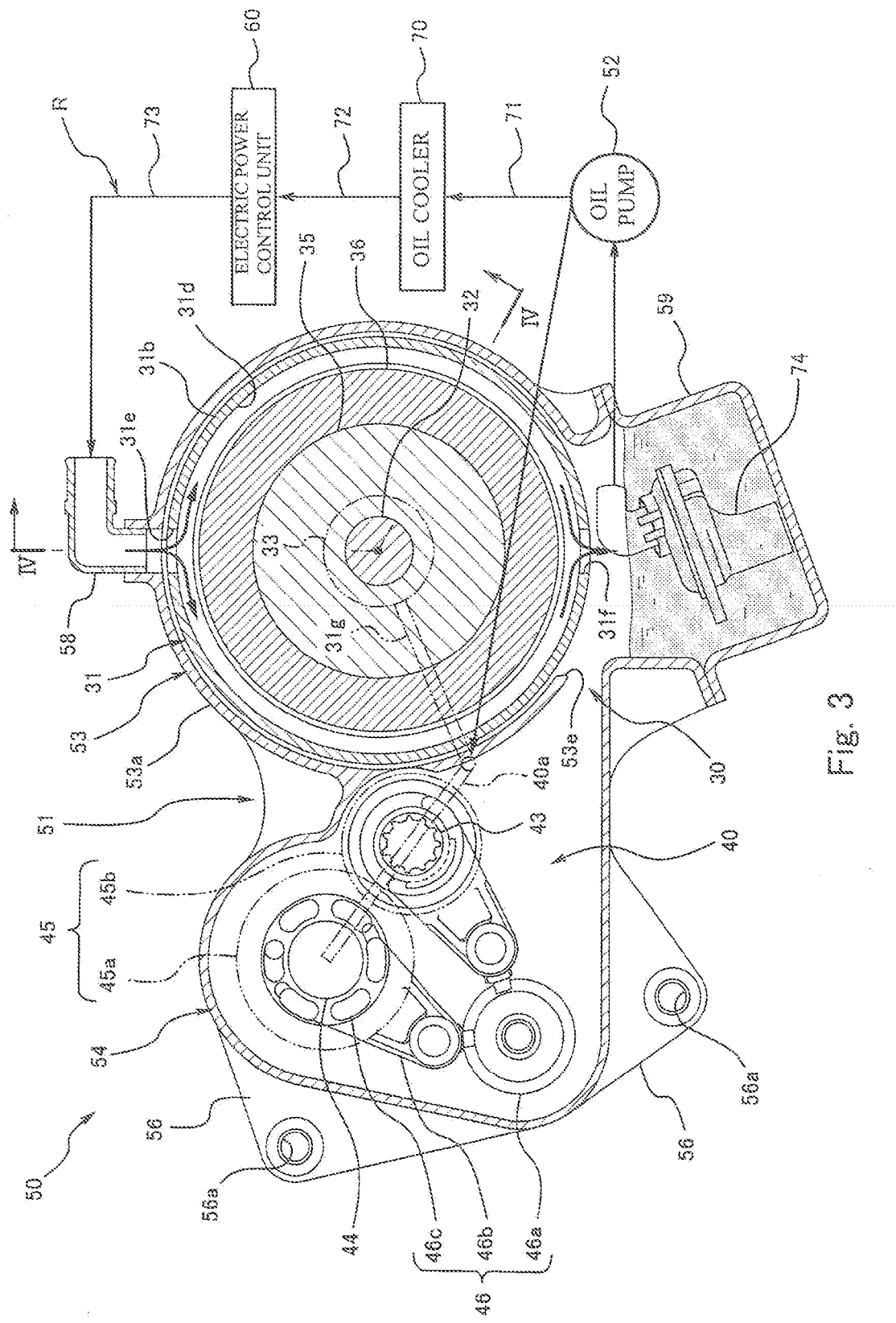
FIG. 3 is a cross-sectional view showing a structure of a motor accommodating section when the motor unit is seen from right, which is taken along III-III of FIG. 2.
Figure 4:
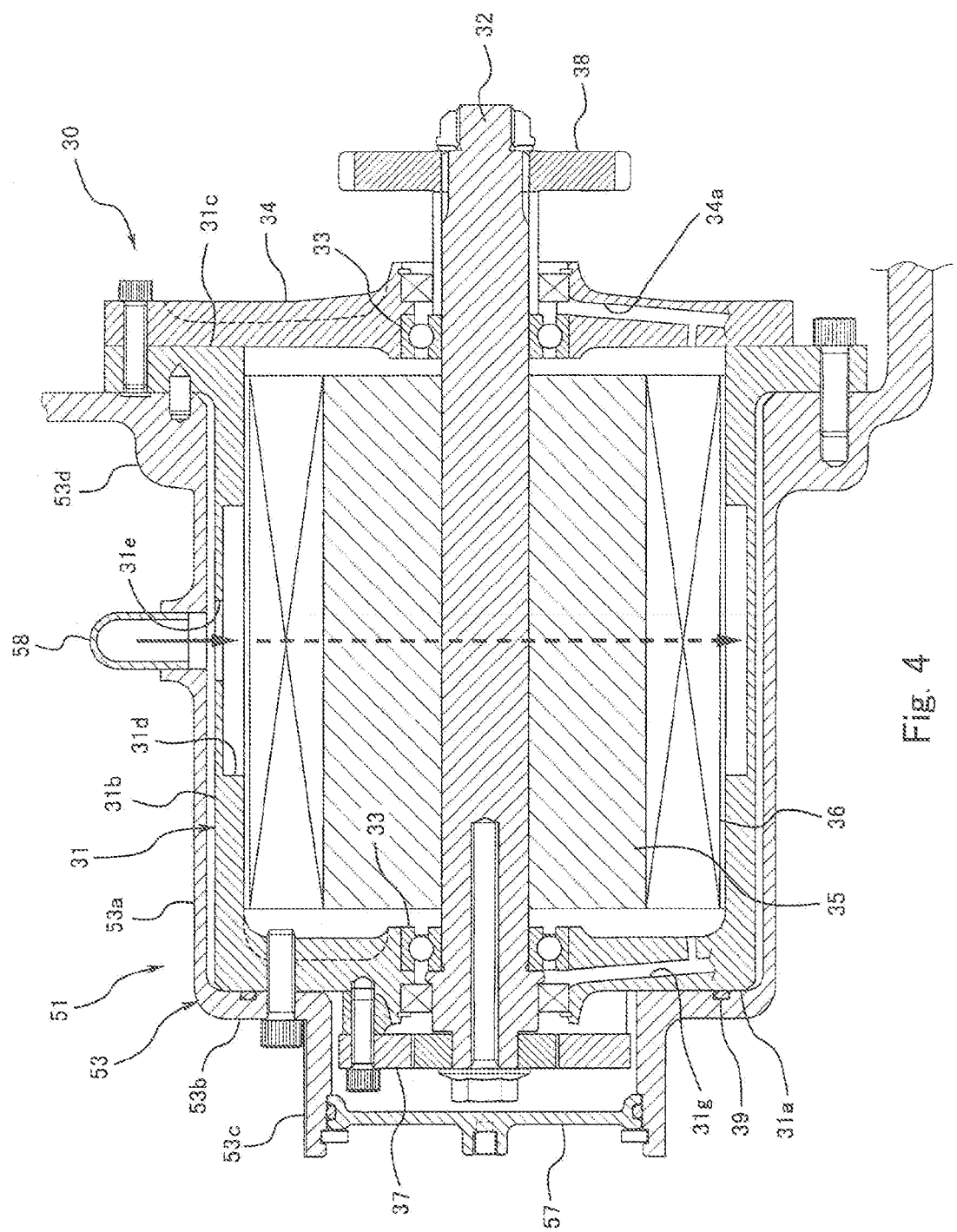
FIG. 4 is a cross-sectional view showing the structure of the motor accommodating section, which is taken along IV-IV of FIG. 3.

FIG. 2 is an exploded view showing a schematic structure of the driving motor 30 and the transmission 40 in the motor unit 50. FIGS. 3 and 4 are cross-sectional views showing a structure of a motor accommodating section. As can be seen from FIG. 2, a case 51 of the motor unit 50 is constructed in such a manner that a motor accommodating section 53 which opens rightward and a transmission accommodating section 54 (transmission mechanism accommodating section) which opens rightward are joined to each other in a forward and rearward direction, and a right wall member 55 which is a separate component is joined to close the right opening of the motor accommodating section 53 and the right opening of the transmission accommodating section 54, and fastened to them.

The motor accommodating section 53 has a substantially bottomed cylindrical shape. A cylindrical motor case 31 of the driving motor 30 is accommodated into the motor accommodating section 53 in a state in which the motor case 31 is fitted into the motor accommodating section 53 through the right opening. A motor shaft 32 extends in a rightward and leftward direction along a tubular axis of the motor case 31. The motor shaft 32 is supported by ball bearings 33 (motor bearings) at right and left sides. The left bearing 33 is fitted into a through-hole of a bottom wall portion 31a at a left end of the motor case 31. The right bearing 33 is fitted into a through-hole of a cap 34 closing a right end opening of the motor case 31.

The pair of bearings 33 are mounted to the bottom wall portion 31a and the cap 34 which are wall portions at both ends of the cylindrical motor case 31 in the tubular axis direction, respectively. The motor shaft 32 is attached with a rotor 35 between the bearings 33 such that the rotor 35 is rotatable integrally with the motor shaft 32. Although not shown, a permanent magnet is embedded into an iron core of the rotor 35. A ring-shaped stator 36 is placed in close proximity to the rotor 35 to surround an outer periphery of the rotor 35.

A left end of the motor shaft 32 penetrates the bottom wall portion 31a of the motor case 31 in a leftward direction. A rotational angle sensor 37 such as a resolver is attached to a tip end portion of the left end of the motor shaft 32. A right end of the motor shaft 32 penetrates the cap 34 in a rightward direction. An output gear 38 mounted to a tip end portion of the right end of the motor shaft 32 by a spline, or the like, is in mesh with a clutch gear 43 of the transmission 40. That is, the motor shaft 32 is coupled to the transmission 40 at a right (one side) end portion thereof.

As shown in FIG. 3, a clutch shaft 41 which is an input shaft of the transmission 40 is placed behind and in close proximity to the driving motor 30. A multiplate clutch 42 attached to a right end of the clutch shaft 41 selects whether a rotation from the motor shaft 32 is input or cut off. Specifically, a clutch gear 43 is externally fitted to a right end portion of the clutch shaft 41 such that the clutch gear 43 is rotatable and is in mesh with the output gear 38 of the motor shaft 32. In a state in which the clutch gear 43 is coupled to the clutch shaft 41 by the multiplate clutch 42, the clutch shaft 41 rotates together with the motor shaft 32.

An output shaft 44 of the transmission 40 is placed in parallel with the clutch shaft 41. The clutch shaft 41 and the output shaft 44 are coupled together via gear trains 45 such that the speed of rotation is changeable. That is, as shown in FIG. 3, a transmission operation mechanism 46 including a shift drum 46a, a shift fork 46b, a dog clutch 46c, etc., is configured to change a combination of gears 45a and 45b connected in the gear trains 45. Thereby, a transmission ratio of an input/output rotation, i.e., a transmission gear position of the transmission 40 is changed.

As shown in FIG. 2, a sprocket 47 is attached to a left end of the output shaft 44 through which the rotation with the changed speed is output. A chain 48 (indicated by an imaginary line) is wrapped around a sprocket 3a of the rear wheel 3 of FIG. 1 and the sprocket 47. Note that a driving power transmission mechanism for transmitting the driving power of the driving motor 30 is not limited to the multistage transmission 40 as described above, but may be, for example, a reduction gear mechanism in which a transmission ratio is constant.

The transmission accommodating section 54 accommodating the transmission 40 as described above has a relatively great thickness among constituents of the motor unit case 51. The transmission accommodating section 54 has a relatively high stiffness as in a transmission case of a general internal combustion engine. As shown in FIG. 3, at right and left sides of the transmission accommodating section 54, triangular fastening sections 56 protrude rearward and downward. The fastening sections 56 are fastened to the pivot frame 9 as shown in FIG. 1 by bolts (not shown) inserted into circular holes 56a formed in the fastening sections 56, respectively.

The motor accommodating section 53 of the bottomed cylindrical shape, which accommodates the driving motor 30, is joined to the transmission accommodating section 54 in the vicinity of the right end opening. In this example, a left side of the motor accommodating section 53 is not joined to the transmission accommodating section 54. That is, the motor accommodating section 53 is connected to the transmission accommodating section 54 in a cantilever state. As shown in FIG. 4, a peripheral wall portion 53a of the motor accommodating section 53 has a small wall thickness (e.g., 3 to 4 mm). The peripheral wall portion 53a has a low stiffness and therefore is deflected relatively easily. A clearance is formed between the peripheral wall portion 53a and a peripheral wall portion 31b of the motor case 31 which is adjacent to the peripheral wall portion 53a. Therefore, the motor case 31 is less affected by the deflection of the motor accommodating section 53.

A ring-shaped wall portion 53b is formed at a left end of the motor accommodating section 53 such that the wall portion 53b extends inward from the peripheral wall portion 53a. An outer portion of the bottom wall portion 31a of the motor case 31 is joined to the wall portion 53b. A cylindrical wall portion 53c extends outward, i.e., leftward from an inner side of the ring-shaped wall portion 53b and surrounds the rotational angle sensor 37. In other words, a left end wall portion of the motor accommodating section 53 has an opening having a size corresponding to the rotational angle sensor 37, and the cylindrical wall portion 53c is provided such that it is connected to a periphery of this opening and accommodates the rotational angle sensor 37.

A lid member 57 of a disc shape is internally fitted to a stepped portion formed at an inner periphery of a tip end portion of the cylindrical wall portion 53c, and is easily detachable. That is, since the lid member 57 is removably attached to a left end of the motor accommodating section 53, which is a left end of the case 51 of the motor unit 50, the lid member 57 is easily detached during maintenance, and inspection and maintenance of the rotational angle sensor 37 can be carried out.

The peripheral wall portion 53a of the motor accommodating section 53 has a smaller wall thickness and has a relatively low stiffness as described above, while a thick portion 53d (shown in FIG. 4) having a greater wall thickness is provided in the vicinity of the right end opening of the motor accommodating section 53, and a stiffness with which the thick portion 53d is joined to the transmission accommodating section 54 is relatively high. A thick flange 3c extending radially outward is provided at a right end of the motor case 31 accommodated in the motor accommodating section 53 such that the flange 31c is connected to an opening of the peripheral wall portion 31b and extends radially outward. The flange 31c is joined and fastened to the thick portion 53d at the right end of the motor accommodating section 53.

The cap 34 is joined and fastened to the flange 31c from rightward. Since the thick flange 31c and the cap 34 of the motor case 31 are joined and fastened to the thick portion 53d of the motor accommodating section 53, the right end portion of the motor accommodating section 53, i.e., the joint portion where the motor accommodating section 53 is joined to the transmission accommodating section 54 has a very high stiffness.

While the right end portion of the motor accommodating section 53 which is joined to the transmission accommodating section 54 has a high stiffness, the peripheral wall portion 53a extending leftward from the right end portion has a low stiffness, and the motor case 31 which is a separate component is accommodated therein. Therefore, an unnecessary increase in a rotational resistance in the driving motor 30 is suppressed, and the rotational power is surely transmitted by the transmission 40 joined to the right end of the motor shaft 32.

If the vehicle body frame such as the main frame 8 is warped or twisted, during driving of the electric motorcycle 1, a stress is applied to the transmission accommodating section 54 fastened at right and left sides to the pivot frame 9. However, the transmission accommodating section 54 has a relatively great wall thickness and a high stiffness, and therefore, is not deflected greatly. By comparison, the motor accommodating section 53 suspended by the hanger brackets 81 is thinned to reduce the weight, and therefore the motor unit case 51 including the motor accommodating section 53 is deflected to some degree as a whole.

However, as described above, the motor accommodating section 53 is joined to the transmission accommodating section 54 at the right end portion having a high stiffness, and is not joined at the left end portion, i.e., the motor accommodating section 53 is connected to the transmission accommodating section 54 in a cantilever state, and the peripheral wall portion 53a thereof has a low stiffness. Because of this, the motor case 31 accommodated in the motor accommodating section 53 is less likely to be affected by the deflection of the motor unit case 51. Therefore, great misalignment of the bearings 33 of the motor shaft 32 in the motor case 31 does not occur, and a problem, for example, an increase in a rotational resistance of the motor shaft 32 is suppressed effectively.

Since the entire motor unit case 51 is deflected as described above, a positional relationship between the transmission accommodating section 54 and the motor accommodating section 53 changes. However, the right end portion where the motor accommodating section 53 is joined to the transmission accommodating section 53 is not displaced so much because its stiffness is high. That is, the right end portion of the motor shaft 32, in the vicinity of the location where the output gear 38 is coupled to the clutch gear 43 of the transmission 40, is not displaced so much, and this displacement is absorbed by the backlash of these gears.

—Cooling Structure of Driving Motor—

Next, a cooling structure of the driving motor 30 will be described with reference to FIGS. 3 and 4. In the present embodiment, by utilizing a double-wall structure in which the motor case 31 is accommodated into the motor accommodating section 53 of the motor unit case 51 as described above, a cooling oil passage 31d of the driving motor 30 is formed inside of the motor case 31 to cause the cooling oil to directly contact the stator 36.

The stator 36 is configured such that a plurality of electromagnetic coils are wound around an iron core (stator core) which is made of an electromagnetic steel plate. The stator 36 is pressed into and internally fitted to the peripheral wall portion 31b of the motor case 31, by, for example, shrink fitting. In a substantially center portion in the rightward and leftward direction in the peripheral wall portion 31b extending in the rightward and leftward direction, a shallow groove which has a rectangular cross-section and opens in an inner peripheral surface is formed. The oil passage 31d of an annular shape extending circumferentially is formed between the peripheral wall portion 31b and an outer peripheral surface of the stator 36.

An oil introduction port 31e opens in an upper portion of the peripheral wall portion 31b of the motor case 31 and is connected to the oil passage 31d. The oil is introduced from a plug 58 penetrating the peripheral wall portion 53a of the motor accommodating section 53 above the oil introduction port 31e. The plug 58 protrudes upward from the peripheral wall portion 53a of the motor unit case 51 and is coupled to a lower end of the return hose 73 (see FIG. 1). Through the plug 58, the oil flowing downward from the electric power control unit 60 is drawn into the motor unit case 51.

The oil having flowed downward through the return hose 73 and having been drawn into the motor unit case 51 from the plug 58 flows into the oil passage 31d inside of the peripheral wall portion 31b of the motor case 31 through the introduction port 31e, is divided circumferentially as indicated by arrows of FIG. 3 to flow along an outer periphery of the stator 36 (in FIG. 4, the flow of the oil is schematically shown by a broken line). The oil effectively derives heat from the stator 36, and then is discharged downward from an oil discharge port 31f in a lower portion of the motor case 31.

As shown in FIG. 3, below the oil discharge port 31f, the peripheral wall portion 53a of the motor accommodating section 53 in the motor unit case 51 is cut with a great dimension to form a hollow portion 53e. The oil discharge port 31f faces an oil pan 59 in a lower portion of the motor unit case 51 via the hollow portion 53e. Therefore, the oil discharged from the oil discharge port 31f is dropped downward and returned to the oil pan 59. A level of the oil stored in the oil pan 59 is set lower than a lowermost portion of the motor case 31.

As described above, the clearance is formed between the peripheral wall portion 53a of the motor accommodating section 53 and the peripheral wall portion 31b of the motor case 31 which is adjacent to the peripheral wall portion 53a in the motor unit case 51. Therefore, when the oil is drawn into the motor unit case 51 from the plug 58 and flows into the oil passage 31d inside of the peripheral wall portion 31b of the motor case 31 through the introduction port 31e as described above, a portion of the oil flows into the clearance formed between the peripheral wall portion 53a and the peripheral wall portion 31b adjacent to the peripheral wall portion 53a.

The oil flows in the rightward and leftward direction through the clearance formed between the peripheral wall portion 53a and the peripheral wall portion 31b adjacent to the peripheral wall portion 53a. At the right end portion, the oil leaks out from a clearance between the flange 31c of the motor case 31 and the thick portion 53d of the motor accommodating section 53 and reaches the oil pan 59 located therebelow. By comparison, at the left end portion of the motor accommodating section 53, there is provided an O-ring 39 (annular seal member) of a large diameter placed between the bottom wall portion 31a of the motor case 31 and the ring-shaped wall portion 53b which are joined together. Therefore, there is no fear that the oil contacts the rotational angle sensor 37 enclosed by the O-ring 39.

As schematically shown in FIG. 3, the oil stored in the oil pan 59 is suctioned into the oil pump 52 via an oil filter 74, is discharged from the oil pump 52 to the lower hose 71, and circulates through a circulation path R including the lower hose 71, the oil cooler 70, the upper hose 72 and the return hose 73. Although not shown, an oil passage which provides communication between a discharge port of the oil pump 52 and the lower hose 71 is formed in the motor unit case 51.

Oil passages which branch from the oil passage between the discharge port of the oil pump 52 and the lower hose 71 are formed in the motor unit case 51 and the motor case 31 to feed the oil to lubricating portions of the driving motor 30 and the transmission 40. For example, FIGS. 3 and 4 show oil passages 31g and 34a formed in the bottom wall portion 31a and the cap 34 in the motor case 31, respectively to feed the oil to the bearings 33. In addition, in FIG. 3, an oil passage 40a for feeding the oil to the transmission 40 is represented by a virtual line.

The oil fed to the oil cooler 70 via the lower hose 71 is fed to the electric power control unit 60 via the upper hose 72 after the oil is cooled in the oil cooler 70. As exemplarily shown in FIG. 5, a cooler 63 is built into a rear portion (left portion in FIG. 5) of an upper portion of the case 62 of the electric power control unit 60, i.e., a portion which is relatively lower in the forward and rearward direction in a state in which the case 62 is built into the electric motorcycle 1. An electrode terminal 64 protrudes from a front portion of the cooler 63. The electrode terminal 64 penetrates a floor portion of the battery box 20 and is connected to a bus bar inside of the battery box 20 in a state in which the case 62 of the electric power control unit 60 is mounted to the battery box 20 located thereabove.

Under the cooler 63, a substrate 61a of a power module 61 is accommodated into the case 62 such that a power semiconductor chip 61b mounted to an obverse surface of the substrate 61a is oriented downward, while a reverse surface of the substrate 61a is in contact with a lower surface of the cooler 63. The cooler 63 has a passage 63a having a labyrinth structure in which a flow of the oil is turned back. Plugs 65 are provided in a forward portion and a rearward portion of a right side wall of the cooler 63 to correspond to an entrance and an exit of the passage 63a, respectively.

As shown in FIG. 1, the upper hose 72 is coupled to the forward plug 65, while the return hose 73 is coupled to the rearward plug 65. The electric power control unit 60 incorporating the cooler 63 which is fed with the oil is located in a highest position in the circulation passage R including the lower hose 71, the upper hose 72 and the return hose 73. Therefore, depending on a height of the electric power control unit 60, to be precise, a height of the cooler 63, a driving load of the oil pump 52 for feeding the oil with a pressure is determined.

In the present embodiment, since the electric power control unit 60 is located above and in close proximity to the motor unit 50, a loss caused by actuation of the oil pump 52 for feeding the oil with a pressure to the electric power control unit 60 is less. In addition, the oil is fed to the lubricating portions of the driving motor 30 and the transmission 40 through the oil passages which branch from the passage before the oil is fed to the lower hose 71. Because of this, the oil for the lubricating portions of the driving motor 30 and the transmission 40 is not fed to the oil cooler 70 and to the electric power control unit 60. This can also lessen a loss caused by actuation of the oil pump 52.

Figure 6:
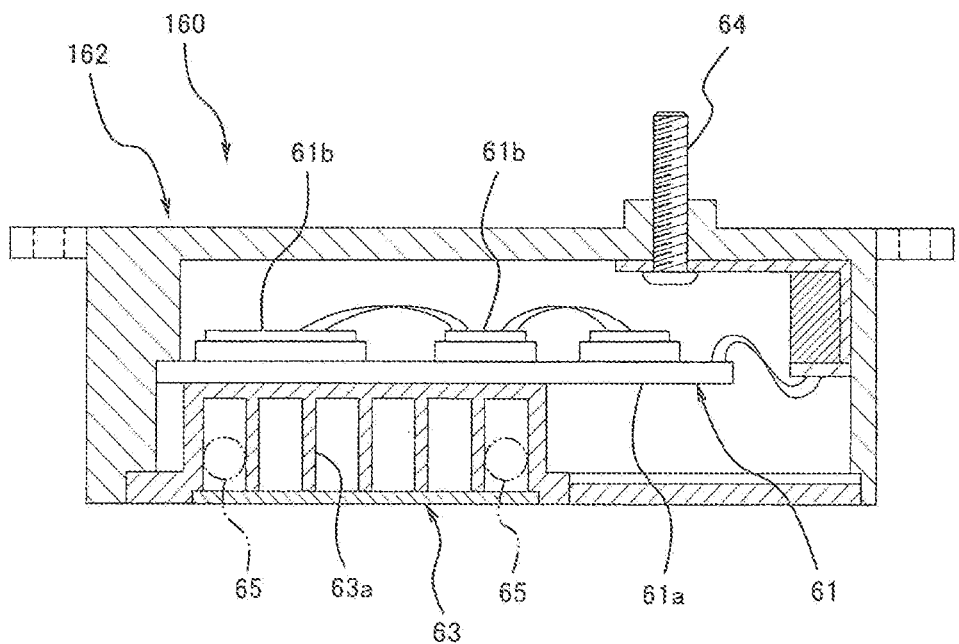
FIG. 6 is a view showing a modified example of the cooling structure, corresponding to FIG. 5.

Instead of placing the cooler 63 in the upper portion of the case 62 of the electric power control unit 60 as described above, for example, as shown in FIG. 6, the cooler 63 may be placed in a lower portion inside of a case 162 in an electronic power control unit 160. In this construction, a loss caused by actuation of the oil pump 52 can be further lessened.

In accordance with the electric motorcycle 1 according to the present embodiment, as described above, the transmission accommodating section 54, of the motor unit case 51 accommodating the driving motor 30 and the transmission 40, is fastened at right and left sides to the pivot frame 9, and the motor accommodating section 53 is joined to the transmission accommodating section 54 at the end portion where the motor shaft 32 is coupled to the transmission 40. Therefore, even when the motor unit case 51 is deflected due to warping or twisting of the vehicle body frame during driving of the electric motorcycle 1, deflection of the motor accommodating section 53 can be suppressed, and a problem such as an increase in the rotational resistance of the driving motor 30 can be suppressed.

Even when the motor unit case 51 is deflected, and the driving motor 30 and the transmission 40 are displaced from each other as described above, the displacement of the motor shaft 32 due to this displacement between the driving motor 30 and the transmission 40 is not great at the side where the motor shaft 32 is coupled to the transmission 40 and is absorbed by the backlash of the gears. Therefore, the rotational power of the driving motor 30 can be more surely transmitted to the transmission 40.

Other Embodiments

The above described embodiment is merely exemplary, and is in no way intended to limit the present invention, its applications, and its uses. For example, although in the present embodiment, the circulation path R of the cooling oil is provided from the motor unit 50 to the electric power control unit 60 by way of the oil cooler 70 located outside the electric power control unit 60, the oil is not necessarily cooled by the oil cooler 70 so long as heat radiation is caused by circulating the oil.

Although in the motor unit 50 of the present embodiment, the oil is flowed through the cooling oil passage 31d formed in the outer periphery of the stator 36 pressed into the motor case 31 of the driving motor 30 to directly cool the stator 36, a direct cooling structure using the oil is not necessarily provided.

Although in the motor unit case 51 of the present embodiment, the right end portion of the motor accommodating section 53 which has a high stiffness is joined to the transmission accommodating section 54 in a cantilever state, the present invention is not limited to this. For example, the left end or the left end portion of the motor accommodating section 53 may be joined to the transmission accommodating section 54. In that case, the left end or the left end portion of the motor accommodating section 53 may be joined to the transmission accommodating section 54 with a relatively low stiffness.

It is not necessary to provide the clearance between the peripheral wall portion 53a of the motor accommodating section 53 and the peripheral wall portion 31b of the motor case 31 accommodated in the motor accommodating section 53, in the motor unit case 51. Or, the peripheral wall portion 53a of the motor accommodating section 53 need not be made thinner than the peripheral wall portion 31b of the motor case 31, provided that the stiffness of the peripheral wall portion 53a of the motor accommodating section 53 is lower as compared to the motor case 31 like the present embodiment.

A clearance may be provided between the ring-shaped wall portion 53b at the left end of the motor accommodating section 53 and the bottom wall portion 31a of the motor case 31. Thereby, the motor case 31 is less likely to be affected by the deflection of the motor unit case 51 which would be caused by warping or twisting of the vehicle body frame of the electric motorcycle 1.

Although in the above embodiment, the electric motorcycle 1 has been described, the electric vehicle of the present invention is not limited to the motorcycle, but may be, for example, an ATV (all terrain vehicle), a small truck, etc.

INDUSTRIAL APPLICABILITY

As described above, a saddle-type electric vehicle of the present invention is capable of suppressing an increase in a rotational resistance of a driving motor due to warping or twisting of a vehicle body frame, during driving, while reducing a weight of a case of a motor unit, and is particularly effectively applicable to an electric motorcycle.

REFERENCE CHARACTERS LIST 1 electric motorcycle (electric vehicle)
8 main frame (vehicle body frame)
9 pivot frame (vehicle body frame)

30 driving motor (electric motor)
31 motor case
31a bottom wall portion of motor case (end wall portion of motor case)
31b peripheral wall portion of motor case
31d oil passage
31e oil introduction port
31f oil discharge port
32 motor shaft (output shaft of electric motor)
33 bearing (motor bearing)
34 cap (end wall portion of motor case)
35 rotor
36 stator
37 rotational angle sensor
39 O-ring (annular seal member)
40 transmission (power transmission mechanism)
50 motor unit
51 motor unit case
52 oil pump
53 motor accommodating section
53a peripheral wall portion of motor accommodating section
53b ring-shaped wall portion (the other end wall portion of motor accommodating section)
54 transmission accommodating section (transmission mechanism accommodating section)
57 lid member
59 oil pan
60 electric power control unit (electric power controller)
70 oil cooler (heat exchanger)
71 lower hose (circulation passage)
72 upper hose (circulation passage)
73 return hose (circulation passage)
R circulation passage

The invention claimed is:

1. A saddle-type electric vehicle comprising:
an electric motor for driving the electric vehicle;
a power transmission mechanism for transmitting driving power generated by the electric motor; and
a motor unit case including a motor accommodating section for accommodating the electric motor and a transmission mechanism accommodating section for accommodating the power transmission mechanism such that the motor accommodating section and the transmission mechanism accommodating section have a unitary construction;
wherein an output shaft of the electric motor extends in a rightward and leftward direction of the vehicle, and one end portion of the output shaft in the rightward and leftward direction is coupled to the power transmission mechanism;
wherein the transmission mechanism accommodating section of the motor unit case is fastened at right and left sides to a vehicle body frame, and the motor accommodating section is connected to the transmission mechanism accommodating section in a cantilever state such that the motor accommodating section is joined at one end portion of the right and left sides in the rightward and leftward direction to the transmission mechanism accommodating section and is not joined at another end portion of the right and left sides to the transmission mechanism accommodating section;
wherein the electric motor has a cylindrical motor case which is accommodated in the motor accommodating section;
wherein the motor case is provided with bearings on wall portions at both ends of the motor case, a rotor is supported between the bearings such that the rotor is rotatable integrally with the output shaft of the electric motor, and a stator of the electric motor which encloses an outer periphery of the rotor is internally fitted to a peripheral wall of the motor case; and
wherein the peripheral wall of the motor case has a greater thickness than a peripheral wall of the motor accommodating section which is adjacent to the peripheral wall of the motor case.

2. A saddle-type electric vehicle comprising:
an electric motor for driving the electric vehicle;
a power transmission mechanism for transmitting driving power generated by the electric motor; and
a motor unit case including a motor accommodating section for accommodating the electric motor and a transmission mechanism accommodating section for accommodating the power transmission mechanism such that the motor accommodating section and the transmission mechanism accommodating section have a unitary construction;
wherein an output shaft of the electric motor extends in a rightward and leftward direction of the vehicle, and one end portion of the output shaft in the rightward and leftward direction is coupled to the power transmission mechanism;
wherein the transmission mechanism accommodating section of the motor unit case is fastened at right and left sides to a vehicle body frame, and the motor accommodating section is connected to the transmission mechanism accommodating section in a cantilever state such that the motor accommodating section is joined at one end wall portion of the right and left sides in the rightward and leftward direction to the transmission mechanism accommodating section and is not joined at a second end wall portion of the right and left sides to the transmission mechanism accommodating section;
wherein the electric motor has a cylindrical motor case which is accommodated in the motor accommodating section;
wherein the motor case is provided with bearings on end wall portions at both ends of the motor case, a rotor is supported between the bearings such that the rotor is rotatable integrally with the output shaft of the electric motor, and a stator of the electric motor which encloses an outer periphery of the rotor is internally fitted to a peripheral wall of the motor case; and
wherein a cooling oil passage is formed to extend circumferentially between an outer periphery of the stator of the electric motor and a peripheral wall of the motor case which is fitted to the outer periphery of the stator, an oil introduction port opens in an upper portion of the peripheral wall of the motor case such that the oil introduction port is connected to the oil passage, and an oil discharge port opens in a lower portion of the peripheral wall of the motor case such that the oil discharge port faces an oil pan in a lower portion of the motor unit case.

3. The saddle-type electric vehicle according to claim 2, wherein the motor unit case is provided with an oil pump for suctioning up oil from the oil pan and discharging the oil, and with an oil passage used to feed the oil discharged from the oil pump to the bearings of the output shaft of the electric motor and to the power transmission mechanism.

4. The saddle-type electric vehicle according to claim 3, comprising:

a circulation passage used to circulate the oil between the motor unit case and a heat exchanger outside of the motor unit case;

wherein the oil passage used to feed the oil to the power transmission mechanism is provided to divide a flow of the oil discharged from the oil pump in a location before the circulation passage.

5. The saddle-type electric vehicle according to claim 3, wherein a rotational angle sensor is attached to another end portion of the output shaft penetrating an end wall portion in the rightward and leftward direction in the motor case;

and wherein the second end wall portion of the motor accommodating section is joined to an outer peripheral portion of the end wall portion of the motor case, and an annular seal member intervenes between the end wall portions to enclose the rotational angle sensor.

6. The saddle-type electric vehicle according to claim 5, wherein the second end wall portion of the motor accommodating section is provided with an opening in a predetermined range corresponding to the rotational angle sensor, and a lid member is removably attached to cover the opening.

\* \* \* \* \*